United States Patent
Li

(10) Patent No.: US 9,971,431 B2
(45) Date of Patent: May 15, 2018

(54) INSTRUCTION SIGNAL GENERATION APPARATUS, FLEXIBLE DEVICE AND BEND DETECTION METHOD

(71) Applicant: BOE TECHNOLOGY GROUP CO., LTD., Beijing (CN)

(72) Inventor: Zhao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 118 days.

(21) Appl. No.: 14/895,101

(22) PCT Filed: May 15, 2015

(86) PCT No.: PCT/CN2015/079125
§ 371 (c)(1),
(2) Date: Dec. 1, 2015

(87) PCT Pub. No.: WO2016/101513
PCT Pub. Date: Jun. 30, 2016

(65) Prior Publication Data
US 2016/0282974 A1  Sep. 29, 2016

(30) Foreign Application Priority Data
Dec. 23, 2014 (CN) .......................... 2014 1 0815356

(51) Int. Cl.
G06F 3/045 (2006.01)
G06F 3/041 (2006.01)
G06F 1/16 (2006.01)

(52) U.S. Cl.
CPC ............ *G06F 3/041* (2013.01); *G06F 1/1626* (2013.01); *G06F 1/1652* (2013.01); *G06F 1/1694* (2013.01); *G06F 2203/04102* (2013.01)

(58) Field of Classification Search
USPC ............... 345/156, 173, 174, 158, 175, 204; 333/187; 359/296
See application file for complete search history.

(56) References Cited

U.S. PATENT DOCUMENTS

2008/0174852 A1* 7/2008 Hirai .................. G02F 1/167
  359/296
2009/0219247 A1 9/2009 Watanabe et al.
(Continued)

FOREIGN PATENT DOCUMENTS

CN 101295219 A 10/2008
CN 102629446 A 8/2012
(Continued)

OTHER PUBLICATIONS

Chinese Office Action dated Jan. 22, 2017.
(Continued)

*Primary Examiner* — Thuy Pardo
(74) *Attorney, Agent, or Firm* — Dilworth & Barrese, LLP.; Michael J. Musella, Esq.

(57) ABSTRACT

A flexible device, an instruction signal generation apparatus for the flexible device, and a bend detection method for the flexible device. The instruction signal generation apparatus comprises a sensing module (101) and a responding module (102), the sensing module (101) is configured to generate a sense signal having a magnitude associated with a bend degree of the flexible device when the flexible device is bent; and the responding module (102) is configured to receive the sense signal outputted from the sensing module (101) and generate an instruction signal according to the sense signal. A bend type user input manner for the flexible device can be achieved.

17 Claims, 5 Drawing Sheets

(56) References Cited

U.S. PATENT DOCUMENTS

| | | | |
|---|---|---|---|
| 2011/0057873 A1 | 3/2011 | Geissler et al. | |
| 2013/0021305 A1* | 1/2013 | Zuo | H03H 3/02 345/204 |
| 2013/0120081 A1* | 5/2013 | Zuo | H03H 9/02228 333/187 |
| 2014/0049463 A1 | 2/2014 | Seo et al. | |
| 2014/0187227 A1* | 7/2014 | Song | H04M 1/0268 455/418 |
| 2014/0340299 A1* | 11/2014 | Lee | G06F 1/1652 345/156 |
| 2014/0354596 A1* | 12/2014 | Djordjev | G06K 9/0002 345/175 |
| 2015/0042590 A1* | 2/2015 | Ando | G06F 3/0354 345/173 |
| 2015/0331454 A1* | 11/2015 | Song | G06F 1/1652 345/156 |
| 2016/0041581 A1* | 2/2016 | Piccionelli | G06F 1/163 345/156 |
| 2016/0283086 A1* | 9/2016 | Inagaki | G06F 1/1626 |
| 2016/0299592 A1* | 10/2016 | Kim | G06F 3/041 |
| 2017/0131846 A1* | 5/2017 | Huitema | G06F 3/0421 |

FOREIGN PATENT DOCUMENTS

| | | |
|---|---|---|
| CN | 103093699 A | 5/2013 |
| CN | 103176735 A | 6/2013 |
| CN | 103389865 A | 11/2013 |
| CN | 103425343 A | 12/2013 |
| CN | 103501383 A | 1/2014 |
| CN | 103576979 A | 2/2014 |
| CN | 104115096 A | 10/2014 |
| CN | 104461010 A | 3/2015 |
| CN | 204347753 U | 5/2015 |

OTHER PUBLICATIONS

Search Report and Written Opinion dated Sep. 9, 2015 from State Intellectual Property Office of the P.R. China.
Second Chinese Office Action dated May 25, 2017.

* cited by examiner

INSTRUCTION SIGNAL GENERATION APPARATUS, FLEXIBLE DEVICE AND BEND DETECTION METHOD

TECHNICAL FIELD

The present disclosure relates to a field of display technique, and particularly to an instruction signal generation apparatus for a flexible device, a flexible device and a bend detection method.

BACKGROUND

With development of flexible materials, a flexible device capable of bending and deforming has been applied in more and more scenarios. However, the flexible materials in the prior art are generally considered as a substitute for existing rigidity materials, and have been applied to, for example, a flexible screen, a flexible solar battery board and the like, but no consideration has been made on possibility that the flexible materials are adopted as a user input device based on its characteristics of bendable.

SUMMARY

In view of problems in the prior art, the present disclosure proposes an instruction signal generation apparatus for a flexible device, a flexible device and a bend detection method, which can realize a bend type of user input manner for the flexible device.

According to a first aspect of the present disclosure, there is provided an instruction signal generation apparatus for a flexible device, comprising a sensing module and a responding module, the sensing module is configured to generate a sense signal having a magnitude associated with a bend degree of the flexible device when the flexible device is bent; and the responding module is configured to receive the sense signal outputted from the sensing module and generate an instruction signal according to the sense signal.

Optionally, the sense signal is a current signal and/or a voltage signal.

Optionally, the sensing module comprises at least one sub-sensing module, and in a case where the sensing module comprises two or more sub-sensing modules, the two or more sub-sensing modules are arranged at different positions of the flexible device.

Optionally, each of the sub-sensing modules comprises a piezoelectric sensing layer including a polyvinylidene fluoride macromolecules piezoelectric film.

Optionally, each of the sub-sensing modules further comprises a first electrode disposed on a surface at one side of the piezoelectric sensing layer and a second electrode disposed on a surface at the other side of the piezoelectric sensing layer.

Optionally, each of the sub-sensing modules further comprises a first signal output line connected with the first electrode and a second signal output line connected with the second electrode, the first signal output line and the second signal output line are used to output the sense signal to the responding module.

Optionally, the responding module comprises a signal processing unit configured to amplify and/or filter the received sense signal.

Optionally, the sensing module comprises at least one sub-sensing module, the responding module outputs the instruction signal comprising an alarm instruction when the sense signal received from at least part of the at least one sub-sensing module is greater than or equal to a first preset value, the first preset value is a magnitude of the sense signal outputted from the sensing module when the flexible device is in a first bend state.

Optionally, the responding module outputs the instruction signal comprising an operation instruction when it receives at least two sense signals within a certain period of time and the sense signals are greater than a second preset value but smaller than the first preset value; wherein the first preset value is a magnitude of the sense signal outputted from the sensing module when the flexible device is in a first bend state; and the second preset value is a magnitude of the sense signal outputted from the sensing module when the flexible device is in a second bend state.

Optionally, the at least two sense signals are generated from different bend directions of the flexible device.

Optionally, the at least two sense signals are generated from a same bend direction of the flexible device.

Optionally, the operation instruction comprises any one or more of turning page forward, turning page backward, switching application program forward, switching application program backward and switching displayed picture.

Optionally, the instruction signal generation apparatus further comprises an execution module configured to execute the instruction in the instruction signal outputted from the responding module upon receipt of the instruction signal.

Optionally, the execution module comprises a buzzer, a vibrator or an indicator light for executing an alarm instruction.

According to a second aspect of the present disclosure, there is further provided a flexible device comprising any one of the instruction signal generation apparatus described above for the flexible device.

Optionally, the flexible device is a flexible display device, and the responding module is located on a circuit board on which a data driving circuit or a scan driving circuit of the flexible display device is located.

Optionally, the flexible device comprises a display area and a non-display area, the sensing module is disposed surrounding the display area of the flexible device.

According to a third aspect of the present disclosure, there is further provided a bend detection method for a flexible device, comprising: obtaining a bend sense signal whose magnitude is associated with a bend degree of the flexible device, and generating an instruction signal according to the bend sense signal.

Optionally, the bend sense signal is generated by at least part of a plurality of sub-sensing modules distributed at a plurality of positions on the flexible device.

Optionally, the instruction signal comprises any one or more of alarming, turning page forward, turning page backward, switching application program forward, switching application program backward and switching displayed picture.

From the solutions described above, it can be seen that the instruction signal generation apparatus according to the embodiments of the present disclosure can obtain the sense signal generated when the flexible device is bent, and can decide an operation situation or an operation instruction corresponding to the sense signal according to preset conditions. For example, an alarm instruction would be executed when the sense signal represents that the bend degree is too large. On one hand, an operator or a user can be aware of the bend situation of the flexible device through the sense signal, such that the operator or the user can know the bend situation of the flexible display apparatus in real time, thus damage to the device due to misoperations can be avoided. On the other hand, a user instruction can be issued by aid of the flexible display device and operations such as turning page or switching an application program can be executed, which enhance user experiences of the flexible device.

BRIEF DESCRIPTION OF THE DRAWINGS

In order to explain solutions in embodiments of the present disclosure or the prior art more clearly, drawings required as describing the embodiments of the present disclosure or the prior art will be introduced briefly below. Obviously, the drawings described below only some embodiments of the present disclosure, those ordinary skilled in the art may obtain other drawings according to these drawings without any inventive labors.

DETAILED DESCRIPTION

In order to make purpose, technical solutions and advantages of embodiments of the present disclosure apparent, the technical solutions of the embodiments of the present disclosure will be described below clearly and completely in connection with accompanying drawings of the embodiments of the present disclosure. Obviously, the described embodiments are only some, but not all of the embodiments of the present disclosure. Any other embodiments obtained by those ordinary skilled in the art based on the embodiments of the present disclosure without inventive labors should fall into scope sought for protection in the present disclosure.

It should be noted that, as used in the present disclosure, the orientation or position relationship indicated by the terms "up", "down", etc., are the orientation or position relationship shown in drawings, which is only used to facilitate the description of the present disclosure and simplify the description, rather than indicate or suggest that a device or element must have a specific orientation, be configured or operate in the specific orientation, therefore it cannot be construed as any limitations on the present disclosure. Unless otherwise specified, the term "installation", "link", "connection" should be understand broadly and generally, for example, it may be a fixed connection, a detachable connection, or an integrated connection, may be a mechanical connection or an electrically connection; may be connected directly or connected via intervening elements; or also may an internal connection between two components. For those ordinary skilled in the art, the specific meaning of the above terms in the present disclosure may be understood based on their specific situations.

Figure 1:
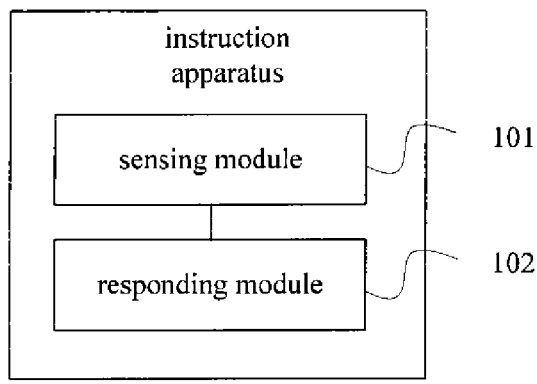
FIG. 1 is a schematic diagram illustrating a structure of an instruction signal generation apparatus for a flexible device according to embodiments of the present disclosure.

FIG. 1 is a schematic diagram illustrating a structure of an instruction signal generation apparatus for a flexible device according to an embodiment of the present disclosure. Referring to FIG. 1, the apparatus comprises: a sensing module 101 and a responding module 102.

The sensing module 101 is configured to generate a sense signal having a magnitude associated with a bend degree of the flexible device when the flexible device is bent.

The responding module 102 is configured to receive the sense signal outputted from the sensing module 101 and generate an instruction signal when the sense signal satisfies a preset condition.

From the solutions described above, it can be seen that the instruction signal generation apparatus can obtain the sense signal generated when the flexible device is bent, and can generate an instruction signal comprising a corresponding indication with respect to preset conditions by using the sense signal. For example, the instruction signal comprising an alarm instruction would be outputted when it is determined from the sense signal that the bend degree of the flexible device is too large. On one hand, an operator or a user can be aware of the bend situation of the flexible device through the sense signal, such that the operator or the user can know the bend situation of the flexible display apparatus in real time and thus damage to the device due to misoperations can be avoided. On the other hand, a user instruction can be issued by aid of the flexible display device and operations such as turning page or switching an application program can be executed, which enhance user experiences of the flexible device.

In an example, the sense signal may be a current signal and/or a voltage signal, a magnitude of the sense signal may be amplitude of the current signal and/or the voltage signal. The operation instruction comprises any one or more of turning page forward, turning page backward, switching application program forward, switching application program backward and switching displayed picture.

In an example, the sensing module 101 may comprise at least one sub-sensing module (not shown in drawings), and in a case where the sensing module comprises two or more sub-sensing modules, the two or more sub-sensing modules are arranged at different positions of the flexible device. Each of the sub-sensing modules comprises a piezoelectric sensing layer including a polyvinylidene fluoride macromolecules piezoelectric film, a first electrode disposed on a surface at one side of the piezoelectric sensing layer and a second electrode disposed on a surface at the other side of the piezoelectric sensing layer. The sense signal may be outputted to the responding module 102 through a first signal output line connected with the first electrode and a second signal output line connected with the second electrode.

Figure 2:
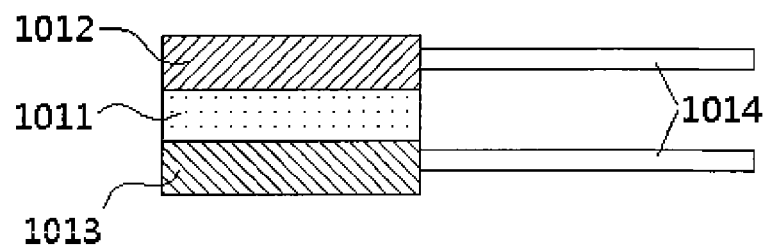
FIG. 2 is a schematic diagram illustrating a section structure of an sub-sensing module according to the embodiments of the present disclosure.
Figure 3:
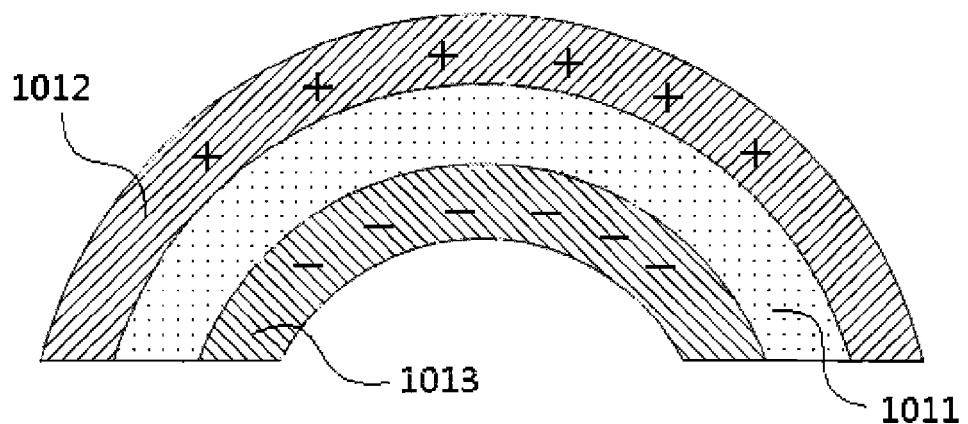
FIG. 3 is a schematic diagram illustrating a section structure of the sub-sensing module in a bend state according to the embodiments of the present disclosure.

More particularly, FIG. 2 is a schematic diagram illustrating a section structure of a sub-sensing module according to the embodiment of the present disclosure. In FIG. 2, the sub-sensing module comprises a piezoelectric sensing layer 1011, a first electrode 1012 disposed on a surface at one side of the piezoelectric sensing layer 1011, a second electrode 1013 disposed on a surface at the other side of the piezoelectric sensing layer 1011 and signal output lines 1014 (comprising the first signal output line and the second signal output line) connected with the first electrode 1012 and the second electrode 1013. FIG. 3 is a schematic diagram illustrating a section structure of the sub-sensing module in an operation state (the flexible device is in a bend state). When a flexible display panel is bent, the sub-sensing modules of the sensing module is caused to be bent. As illustrated in FIG. 3, the piezoelectric sensing layer 1011 is in the bend state, so the sense signal having the magnitude associated with the bend degree would be generated at both sides of the piezoelectric sensing layer 1011, and the first electrode 1012 and the second electrode 1013 located at the two sides of the piezoelectric sensing layer 1011 may collect positive charges or negative charges generated at the two sides of the piezoelectric sensing layer, so that the sense signal may be output to the responding module 102 through the signal output lines 1014.

Of course, the structures shown in FIGS. 2 and 3 are only illustrative, and the each sub-sensing module may be embodied as other structure based on the above operation principle. The responding module 102 is configured to receive the sense signal output from the sensing module, judge whether the received sense signal satisfies the preset conditions, and output the instruction signal when the sense signal satisfies the preset conditions. The responding module may comprise a signal processing unit configured to amplify and/or filter the received sense signal so as to extract effective information on the bend degree of the flexible device.

Based on above, the responding module outputs the instruction signal comprising an alarm instruction when the sense signal outputted from at least one sub-sensing module of the sensing module is greater than or equal to a first preset value. The first preset value is a magnitude of the sense signal outputted from the sensing module when the flexible device is in a first bend state (a bend state in which any point of the flexible device does not exceed its maximum bend degree). Optionally, the first bend state is a bend state in which the flexible device is in its maximum bend degree. Optionally, the first preset value is a maximum value of the sense signal outputted from the responding module when the flexible device is in a normal bend state. Particularly, the first preset value and the first bend state may be set in advance depending on requirements of the user and a limit bend degree of the flexible device.

On the other hand, the responding module outputs the instruction signal comprising an operation instruction when it receives at least two sense signals within a certain period of time and the sense signals are greater than a second preset value but smaller than the first preset value, the second preset value is a magnitude of the sense signal outputted from the sensing module when the flexible device is in a second bend state (a preset state whose bend degree may be sensed). Optionally, the first bend state is a bend state in which the flexible device is in the maximum bend degree, and the second bend state is a bend state in which the flexible device is in a minimum sensible bend degree. That is to say, when the user bends the flexible device twice in the same or different directions within the certain period of time (of course other triggering manners are also possible), a corresponding operation instruction may be executed, which may comprise any one or more of turning page forward, turning page backward, switching application program forward, switching application program backward and switching displayed picture. Particularly, the second preset value and the second bend state may be set in advance depending on the requirements of the user and detection precise of the sensing module. Of course, the at least two sense signals may be generated from the different bend directions or the same bend direction of the flexible device. Preferably, the at least two sense signals are generated from the different bend directions of the flexible device so as to be distinguished from other instructions, and thus misoperations can be avoided.

Further, the instruction signal generation apparatus may further comprise an execution module, not shown in FIG. 1, configured to execute the instruction in the instruction signal upon receipt of the instruction signal output from the responding module. More particularly, when the alarm function is executed, the outputted instruction signal comprises the alarm instruction, and the execution module may comprise a buzzer, a vibrator or an indicator light for executing the alarm instruction. Furthermore, when the operation instruction is executed, the outputted instruction signal comprises the operation instruction, and the execution module may comprise a signal conversion unit configured to convert the instruction signal into a user input signal for processing devices (such as a Single Chip Microcontroller (SCM) or a personal computer, etc) associated with the flexible device, and finally any one or more of turning page forward, turning page backward, switching application program forward, switching application program backward and switching displayed picture may be executed. In this case, the execution module may be integrated together with the processing device, that is, the function of the execution module may be realized by the processing device. Of course, the execution module may be disposed outside the instruction signal generation apparatus, for example, is disposed as a component similar to an interface module in the processing device, but the embodiment of the present disclosure is not limited thereto.

Figure 4:
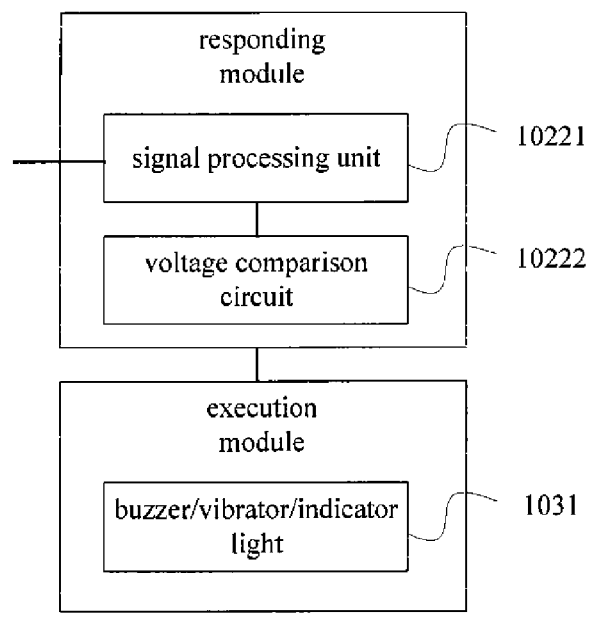
FIG. 4 is a block diagram of a local structure of the instruction signal generation apparatus for the flexible device according to the embodiments of the present disclosure.

More particularly, FIG. 4 is a block diagram illustrating structure of the responding module 102 and the execution module when the instruction signal comprises the alarm instruction. The responding module transfers the sense signal to the signal processing unit 10221 upon receipt of the sense signal outputted from the sensing module. After the signal processing unit 10221 amplifies and/or filters the sense signal, the voltage comparison circuit 10222 may be configured to compare the magnitude of the sense signal with the first preset value. The voltage comparison circuit 10222 in the responding module 102 outputs the instruction signal including the alarm instruction to the execution module when the magnitude of the sense signal is greater than the first preset value, the execution module may execute the alarm instruction with the buzzer/vibrator/indicator light 1031 after receiving the instruction signal, thus a bend alarm function of the instruction signal generation apparatus is achieved. Of course, the structure shown in FIG. 4 is only illustrative, and any other structures or functions are also possible for the responding module and the execution module based on the above operation principle.

According to another embodiment of the present disclosure, there is further provided a flexible device comprising any one of the above-described instruction signal generation apparatus for the flexible device. Optionally, the flexible device is a flexible display device, and the responding module is located on a circuit board on which the data driving circuit or the scan driving circuit of the flexible display device is located. That is, the flexible device may be a piece of electrical page, a mobile phone, a tablet computer, a TV, a notebook computer, a digital photo frame, a navigator and any other product or part with the display function. Of course, the flexible device also may be a flexible device without the display function, such as a flexible operation panel, a flexible controller, or any suitable product or part with a user input function. The present disclosure is not limited thereto.

Thereafter, the solution of the present disclosure would be further described by taking the flexible device with the display function as an example.

Figure 5:
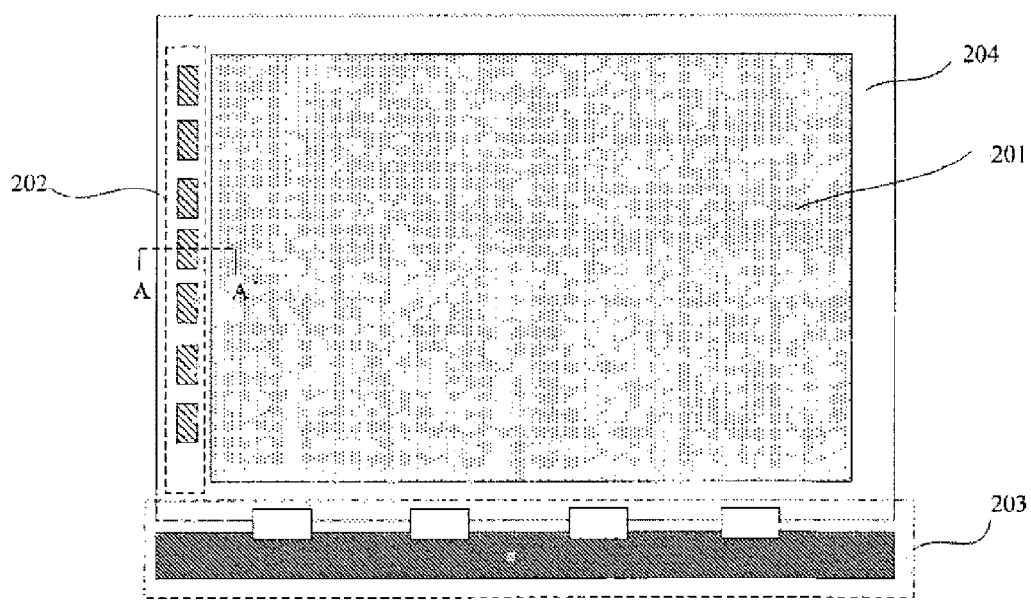
FIG. 5 is a schematic diagram illustrating a structure of the flexible device according to the embodiments of the present disclosure.

FIG. 5 is a schematic diagram illustrating a structure of the flexible device according to the embodiment of the present disclosure, and the flexible device comprises the instruction signal generation apparatus described above.

Figure 8:
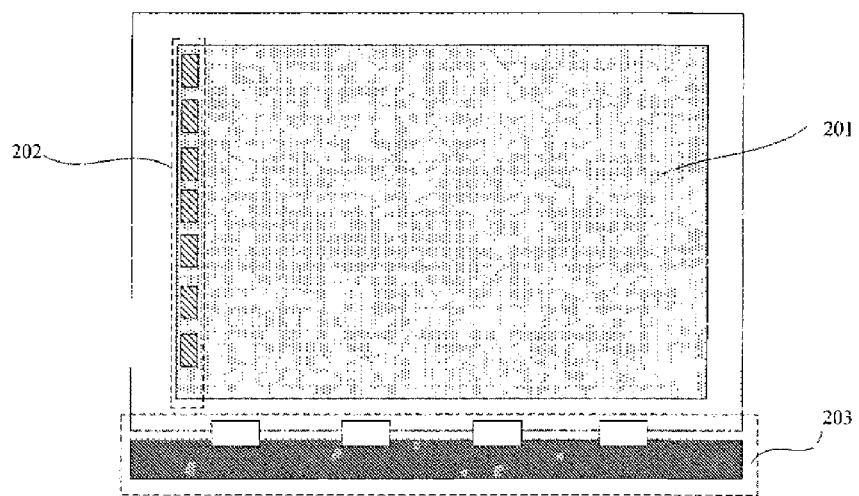
FIG. 8 is a schematic diagram illustrating a structure of another flexible device according to the embodiments of the present disclosure.

In an example, the flexible device comprises a display area 201, a non-display area 204 and a circuit board 203. The sensing module in the instruction signal generation apparatus may be disposed on the non-display area of the flexible device or the display area of the flexible device. The responding module may be integrated on the circuit board 203. FIG. 5 is a schematic diagram illustrating a case in which the sensing module 202 is disposed on the non-display area 204 of the flexible device. Of course, the sensing module 202 also may be disposed on the display area 201, as illustrated in FIG. 8, as long as the responding module 202 does not affect the displaying.

Figure 6:
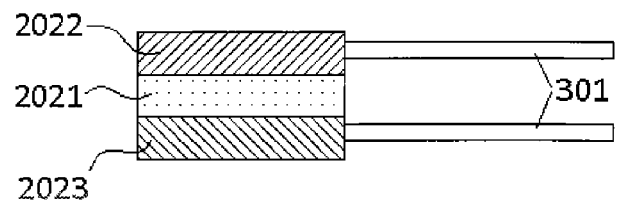
FIG. 6 is a schematic diagram of a section in a direction AA' of FIG. 5.
Figure 7:
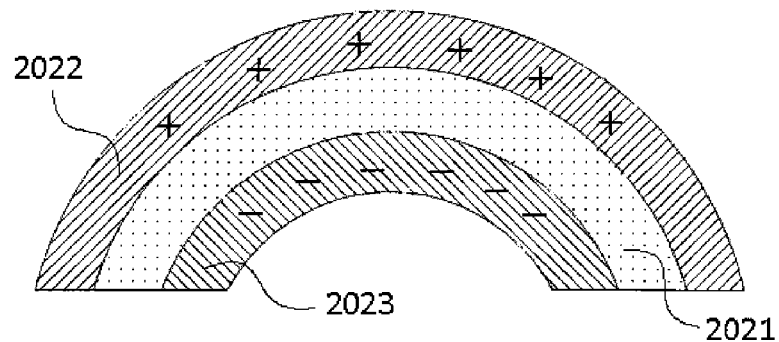
FIG. 7 is a schematic diagram illustrating principle of a sub-sensing module disposed in the flexible device in a bend state according to the embodiments of the present disclosure.

FIG. 6 is a section diagram illustrating a portion of the flexible device shown in FIG. 5 at the sensing module 202 (namely a schematic section diagram in a direction A-A' of FIG. 5). By referring to FIG. 6, the sensing module 202 is disposed on the non-display area of the flexible device while the respective components in the responding module may be arranged on a substrate base of the flexible device. In FIG. 6, only the structure of the sensing module 202 is shown but the substrate base is omitted. Of course, an intervening layer, such as an insulation layer may be disposed between the sensing module and the substrate base, and an insulation layer or other layer structure(s) may also be disposed between the sensing module and an upper substrate or a package cover of the flexible device, but the present disclosure is not limited thereto. In the flexible device, a piezoelectric sensing layer 2021 is disposed in the sensing module 202, and the piezoelectric sensing layer 2021 may generate the sense signals having the magnitude associated with the bend degree at the up and down sides in a direction of thickness of the piezoelectric sensing layer 2021 when the piezoelectric sensing layer 2021 is in a bend state. A first electrode 2022 and a second electrode 2023 connected electrically to the piezoelectric sensing layer 2021 are disposed respectively at both the up and down sides of the piezoelectric sensing layer 2021. With such structure, the sensing module 202 may be bent together with the flexible device when the flexible device is bent under an external force, the piezoelectric sensing layer 2021 in the sensing module 202 generates electrical signals having the magnitude associated with the bend degree at the up and down sides (FIG. 7 illustrates a schematic diagram of the principle that the piezoelectric sensing layer being the bend state generates the electrical signals at the up side and the down side), and in turn the electrical signals are introduced through the first electrode 2022, the second electrode 2023 and the connected wires 301. With the aid of the responding module in the instruction signal generation apparatus, an operator or a user may recognize whether the actual bend degree of the flexible device reaches its bend limitation timely and prevents the flexible display device from being damaged due to the misoperation.

The piezoelectric sensing layer 2021, the first electrode 2022, the second electrode 2023 and the wires 301 (comprising the first signal output line and the second signal output line) constitute the sensing module described in the above solution, and the electrical signal generated at the up and down sides of the piezoelectric sensing layer when it is bent is the sense signal in the above solution.

In an example, by taking a case where some flexible device can only be bent in a special direction into consideration, the sensing module 202 may preferably extend in a bendable direction of the flexible device. For convenience of explanation, taking a case where the flexible device is a rectangle as an example, the bendable direction is a direction in parallel to a long side if the flexible device may be bent or curled in the long side, and the bendable direction is a direction in parallel to a short side if the flexible device may be bent or curled in the short side. In this case, a disposition range of the sensing module 202 may be narrowed adaptively and therefore an area occupied by the sensing module 202 on the flexible device may be reduced and the manufacture cost may also be reduced. Of course, the sensing module 202 may be also disposed surrounding the display area 201, so that the bend or curl in any manner may generate the corresponding electrical signal, and the present disclosure is not limited thereto.

Figure 9:
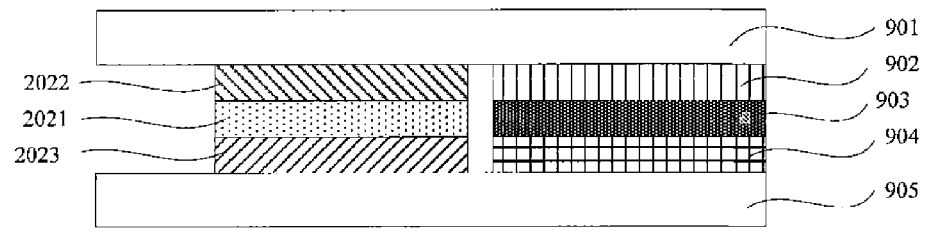
FIG. 9 is a schematic diagram illustrating a section structure of a flexible device according to the embodiments of the present disclosure.

In an example, no matter whether the sensing module is disposed on the display area or the non-display area of the flexible device, both of the first electrode and the second electrode in the sensing module may be manufactured together with electrodes in the flexible device, namely, a synchronous composition process may be utilized, in order to simplify the process and reduce cost. Following description is made by taking an OLED panel as an example of the flexible device, but it should understand that the flexible device obviously can be a liquid crystal panel or other device with the flexible capability. As shown in FIG. 9, the flexible device comprises a first flexible substrate 901 and a second flexible substrate 902, and an OLED light emitting layer 903, an anode 904 and a cathode 902 are arranged between the first flexible substrate 901 and the second flexible substrate 902. The anode 904 and the cathode 902 may be made up of transparent conductive materials or mental materials, the first electrode 2022 of the sensing module and the cathode 902 may be manufactured synchronously, and the second electrode 2023 and the anode 904 may be manufactured synchronously, thus the process may be simplified and the cost may be reduced. Of course, a structure for driving the OLED to emit light and the like, such as a TFT array structure, may also be comprised between the first flexible substrate 901 and the second flexible substrate 902, and their detailed descriptions are omitted herein.

The flexible device further comprises a responding module which may be integrated on the circuit board 203 of the flexible device. The responding module is configured to generate an instruction signal according to the electrical signals (sense signals) generated at both sides of the piezoelectric sensing layer 2021 in the sensing module 202. The responding module may be connected with the first electrode 2022 and the second electrode 2023 via the wires 301, and may comprise digital logic units such as a data selector, a data comparator, etc. the instruction signal may be generated by the digital logic units, or of course may be generated in other manners, and the present disclosure is not limited thereto. The flexible device further comprises an execution module (not shown in drawings) connected with the responding module, which is configured to execute any one or more of operation instructions comprising turning page forward, turning page backward, switching application program forward, switching application program backward and switching displayed picture according to the instruction signal. In this case, the function of the execution module may be realized by a processor of the flexible device, that is to say, the instruction signal may be used to trigger the corresponding program or operation.

In the other hand, the sensing module 202 preferably comprises at least one sub-sensing module, as illustrated in FIG. 5, and each of the sub-sensing modules are separated with each other if a plurality of the sub-sensing modules are adopted. The piezoelectric sensing layer 2021 is disposed in each of the sub-sensing modules (along with the first electrode 2022 and the second electrode 2023), therefore the bend situations at different positions of the flexible device may be obtained by processing the electrical signals generated at the respective piezoelectric sensing layers 2021. Further, more the sub-sensing modules are, smaller the area of the each sub-sensing module is, and more precise and sensitive the detection result of the bend situation is. Of course, the number of the sub-sensing modules and the area of each sub-sensing module may be set depending on a size of the device and a sensitive requirement, and the present disclosure is not limited thereto.

When at least one sub-sensing module is disposed on the flexible device, the responding module may be connected with the first electrodes 2022 and the second electrodes 2023 in the respective sub-sensing modules, and further configured to receive the sense signal from each of the sub-sensing modules and output the instruction signal when the sense signal output from the at least one sub-sensing module satisfies a preset condition.

Figure 10:
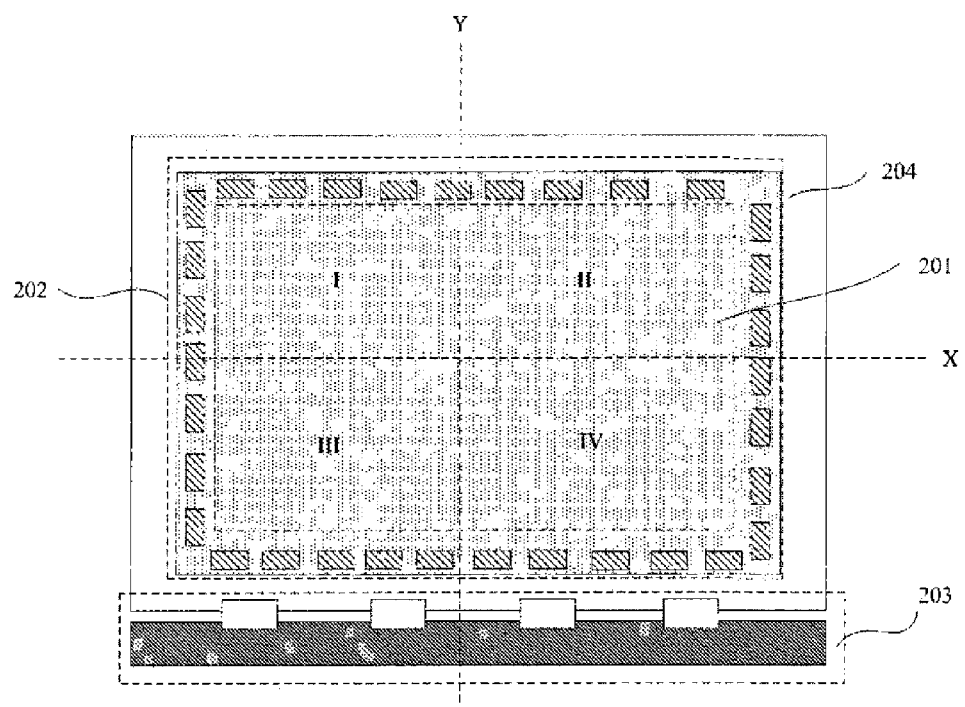
FIG. 10 is a schematic diagram of a further flexible device according to the embodiments of the present disclosure.

In order to monitor the flexible device all round, the sub-sensing modules may be disposed around the display area of the flexible device. With reference to the schematic diagram of structure of a flexible device shown in FIG. 10, the user may bend the flexible device in a X axis direction and a Y axis direction under preset conditions (for example, the bend degree is greater than a second preset value and smaller than a first preset value) within a certain period of time respectively and set the instruction corresponding to such operation to be the turning page instruction, so that the responding module of the instruction signal generation apparatus may output this instruction signal and the execution module of the instruction signal generation apparatus may execute the instruction, thus the turning page operation is realized. Of course, the turning page instruction is only an example herein for explaining the present disclosure, and any other instructions are possible.

Another implementation would be explained as follows. The flexible device may be divided into four regions of I, II, III and IV by the X axis and Y axis, the sub-sensing modules included in the sensing module 202 are distributed on each of the regions and the responding module is configured to receive the signals outputted from the sub-sensing modules. Of course, it may also possible to prescribe that bends in different regions correspond to different operation instructions respectively.

For example, the region II is bent in the X axis once and Y axis once within the certain period of time respectively, the sub-sensing module(s) corresponding to these two bend directions in the region II may output the sense signals, so that the responding module receives the sense signals and would output the operation instruction signal if the sense signals satisfy the preset condition, and then the execution module may execute the operation instruction. For example, the execution module would execute the turning page operation if such operation is set to correspond to the turning page operation.

If such operation occurs in the region III and is set to correspond to an operation for switching application program forward if it occurs in the region III, the responding module may output the corresponding operation instruction signal and the execution module may execute the operation for switching application program forward. Similarly, the execution module may execute an operation for switching application program backward if such operation occurs in the region IV. Of course, the programs or operations capable of being executed by the execution module are not limited thereto.

The responding module and/or the execution module may be integrated into the circuit board 204 on which a Data Drive ID or a Gate Drive ID of the flexible device is located (referring to FIG. 5). Thus, the above circuits may be manufactured on a same print circuit board synchronously, and circuit connection components such as the wires 301 may be formed in the same manners, so the cost may be reduced. Of course, the responding module may be arranged at another position and connected electrically in a corresponding manner, but the present disclosure is not limited thereto. It should be noted that the execution module may be a module embodied in the flexible device, or also may be a module in an external device (such as a display or a display driver) connected with the flexible device, and the present disclosure is not limited thereto.

Further, the piezoelectric sensing layer 2021 may be formed of polyvinylidene difluoride or any other suitable materials with the characteristic for generating the electrical signals having the magnitudes associated with the bend degree at the up and down sides. The term of "associated" means a positive correlation generally, but does not exclude a usage of materials with a negative correlation characteristic being as a replacement material. The detailed implementation principle for the material with the negative correlation characteristic is similar, so details would not be repeated herein. Further, the piezoelectric sensing layer 2021 may be made of a piezoelectric thin film of polyvinylidene difluoride macromolecules, so that the precise and efficiency for the detection are ensured while the occupied space on display device is reduced, and the bendable feature of the flexible device is not affected greatly. Of course, other materials may be added or other structures may be stacked to form the piezoelectric sensing layer 2021, in order that the piezoelectric sensing layer 2021 may have other features, and the present disclosure is not limited thereto.

Particularly, in order to further explain the solution of the embodiment of the present disclosure, an implementation wherein the electrical signal having the magnitude associated with the bend degree is generated at the up and down sides of the piezoelectric sensing layer 2021 such that the operator or user may perceive the bend degree of the flexible device would be described thereafter.

The preset condition may be set depending on a relationship between the bend degree of the piezoelectric sensing layer 2021 and the magnitudes of the electrical signals at the both sides. For example, the preset condition may be set as "a voltage between the first electrode and the second electrode is greater than the first preset value or smaller than the second preset value (the second preset value is smaller than the first preset value)" in a case that the bend degree of the piezoelectric sensing layer 2021 has a positive correlation relationship with the magnitude of the electrical signals at the both sides. More particularly, it may be realized by the voltage comparison circuit 10222, detailed structure may be referred to designs in the prior art and would not be repeated herein. Of course, other preset condition may also be set depending on the characteristics of the material forming the piezoelectric sensing layer 2021, and the present disclosure is not limited thereto.

Furthermore, the responding module may further comprise a signal processing unit 10221 connected with the first electrode 2022 and the second electrode 2023 in the sensing module, which is configured to amplify and/or filter the electrical signal generated at the both sides of the piezoelectric sensing layer when the piezoelectric sensing layer is bent. A circuit implementation of the signal processing unit 10221 may be an amplifying circuit, a filter circuit or a rectification circuit, and details would be omitted herein. Of course, different signal processing effect may also be realized by configuring other signal processing circuit(s) at the front, and the present disclosure is not limited thereto.

The responding module may be integrated into the circuit board 204 at which the Data Drive ID or the Gate Drive ID of the flexible device is located (referring to FIG. 5). Thus, the above circuits may be manufactured on the same print circuit board synchronously, and circuit connection components such as the wires 301 may be formed in the same manners, so the cost may be reduced. Of course, the responding module may be arranged at another position and connected electrically in a corresponding manner, but the present disclosure is not limited thereto.

Additionally, although the sub-sensing modules included in the flexible device are disposed on the different regions of the flexible device according to the embodiment described above, it should be noted that the position distribution manner of the sub-sensing modules in the flexible device is not limited thereto. Based on the embodiments described above, those skilled in the art may dispose the sub-sensing modules both in a horizontal direction and a vertical direction of the flexible device. For example, based on the embodiments described above, the piezoelectric sensing layers may be disposed on different level height in the flexible device, and distribution regions on the different level height may overlap with each other; also, the piezoelectric sensing layers may be not in parallel to the level plane, and may be not in parallel to each other. Therefore, a solution would belong to the scope sought for protection in the present disclosure as long as the sub-sensing modules are distributed on different positions of the flexible device.

It can be seen that, in the embodiments of the present disclosure, the sensing module is disposed outside the display area of the flexible device (generally at a position where the bend degree is maximum), while the piezoelectric sensing layer is disposed between the first electrode and the second electrode in the sensing module, the bend degrees at the different positions of the flexible device may be converted into the electrical signals, which may be detected and further outputted by a conductive layer, according to the characteristics of the piezoelectric sensing layer that it may generate the electrical signal as being bent, and thus the operator or user may recognize the bend situation of the flexible device in real time when real-time displaying or alarm is done based on the electrical signals, which can prevent the device from being damaged due to misoperations.

Further, since the responding module may generate the instruction signal according to the electrical signal, the operation instruction such as turning page or switching application program may be executed according to the instruction signal. That is, a function, for example, of turning page by bending screen or switching application program by bending screen, may be realized by taking the electrical signal generated when bending as the user input.

Figure 11:
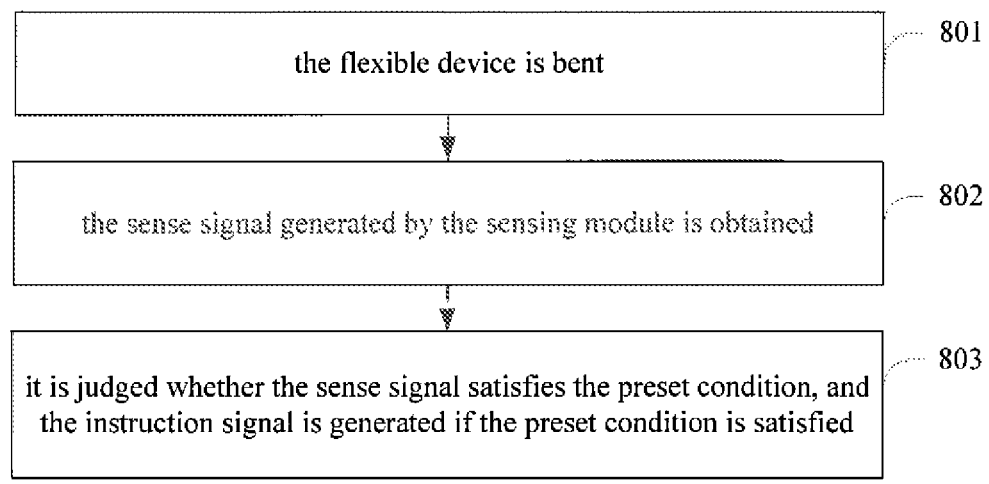
FIG. 11 is a schematic flowchart of a bend detection method according to the embodiments of the present disclosure.

According to another embodiment of the present disclosure, there is further provided a bend detection method for the flexible device, the flexible device comprises the sensing module configured to generate the sense signal having the magnitude associated with the bend degree of the flexible device when the flexible device is bent. FIG. 11 is a schematic flowchart of a bend detection method according to the embodiment of the present disclosure, and the bend detection method comprises processes as follows.

At step 801, the flexible device is bent.

At step 802, the sense signal generated by the sensing module is obtained.

At step 803, it is judged whether the sense signal satisfies the preset condition, and the instruction signal is generated if the preset condition is satisfied.

With respect to any one of the flexible devices described above comprising the sensing module, the bend-type user input may be realized by the method comprising the above steps. That is, when the user bends the flexible device, the instruction for triggering an action or a program execution may be obtained by acquiring and judging the sense signal from the sensing module, thus a user input function similar to that achieved by a user input device such as a mouse or a keyboard can be achieved.

Optionally, the sensing module comprises at least one sub-sensing module. When a plurality of sub-sensing modules are adopted, the sub-sensing modules are distributed at a plurality of positions on the flexible device, and at least one sub-sensing module outputs the sense signal when the flexible device is bent. The configuration of the sub-sensing module(s) can increase a maximum number of supportable instruction types, and the different bend directions, different bend positions, different bend angles and any combination thereof, all of which may be used as a user operation input similar to that of pressing keyboard or moving the mouse.

Optionally, the instruction in the instruction signal comprises any one or more for alarming, turning page forward, turning page backward, switching application program forward, switching application program backward and switching displayed picture. Of course, the instruction which can be included in the instruction signal is not limited thereto according to the embodiments of the present disclosure.

It should be noted that the size of a layer or a region may be exaggerated for clear illustration. Also, it also will be understood that when an element or a layer is referred to as being "on" another element or layer, it can be directly on the other element or layer, or intervening elements or layers may be present therebetween. Further, it will be understood that when an element or a layer is referred to as being "under" another element or layer, it can be directly under the other element or layer, or one or more intervening elements or layers may be present therebetween. Additionally, it also will be understood that when an element or a layer is referred to as being "between" two elements or layers, it can be an unique element or layer between the two elements or layers, or one or more intervening elements or layers may be further present. Like reference numerals refer to like elements throughout.

It should be noted that, as used herein, the relationship terms, such as first, second, etc., are only used to distinguish one entity or operation from another, rather than requiring or suggesting any actual relationship or order among these entities or operations. The term "include", "comprise" or any other variety is intended to cover non exclusive inclusion, thereby the process, method, object or device including/comprising a series of elements includes/comprises not only those elements, but also other elements that are not explicitly listed, or also includes/comprises elements inherent for the process, method, article or equipment. In cases where there is no more restriction, the element defined by a statement "includes/comprises a/one . . . " does not preclude other similar or same elements existed in the process, method, article or equipment. The term "a plurality of . . . " means two or more then two.

It should be noted that, the orientation or position relationship indicated by the terms "up", "down", etc., are the orientation or position relationship shown in drawings, which is only used to facilitate the description of the present disclosure and simplify the description, rather than indicate or suggest that a device or element must have a specific orientation, be configured or operate in the specific orientation, therefore it can not be construed as any limitations on the present disclosure. Unless otherwise specified, the term "installation", "link", "connection" should be understand broadly and generally, far example, it may be a fixed connection, a detachable connection, or a integrated connection, may be a mechanical connection or an electrically connection; may be connected directly or connected via intervening elements; or also may an internal connection between two components. For those ordinary skilled in the art, the specific meaning of the above terms in the present disclosure may be understood based on their specific situations.

The above embodiments are only illustrative for the solutions of the present disclosure rather than limitative to the present disclosure. Although detailed explanations have been given with reference to the above embodiments of the present disclosure, it should be understood for those ordinary skilled in the art that the solutions disclosed in the above embodiments may still be modified, or partial technical features may be replaced equivalently, and these modifications or replacements would not render the essence of the resultant solutions departing from the spirit and scope of the solutions in the embodiments of the present disclosure.

This application claims priority to a Chinese Patent Application No. CN 201410815356.0, titled as "instruction signal generation apparatus, flexible device and bend detection method", filed on Dec. 23, 2014, in the China's State Intellectual Property Office, the disclosure of which is incorporated by reference herein as a whole.

What is claimed is:

1. An instruction signal generation apparatus for a flexible device, comprising a sensing module and a responding module,
   the sensing module is configured to generate a sense signal having a magnitude associated with a bend degree of the flexible device when the flexible device is bent; and
   the responding module is configured to receive the sense signal output from the sensing module and generate an instruction signal according to the sense signal,
   wherein, the sensing module comprises at least one sub-sensing module, and each of the sub-sensing modules comprises a piezoelectric sensing layer, a first electrode disposed on a surface at one side of the piezoelectric sensing layer and a second electrode disposed on a surface at the other side of the piezoelectric sensing layer.

2. The instruction signal generation apparatus of claim 1, wherein the sense signal is a current signal and/or a voltage signal.

3. The instruction signal generation apparatus of claim 1, wherein in a case where the sensing module comprises two or more sub-sensing modules, the two or more sub-sensing modules are arranged at different positions of the flexible device.

4. The instruction signal generation apparatus of claim 1, wherein each of the sub-sensing modules further comprises a first signal output line connected with the first electrode and a second signal output line connected with the second electrode, the first signal output line and the second signal output line are used to output the sense signal to the responding module.

5. The instruction signal generation apparatus of claim 1, wherein the responding module comprises a signal processing unit configured to amplify and/or filter the received sense signal.

6. The instruction signal generation apparatus of claim 1, wherein the sensing module comprises at least one sub-sensing module, the responding module outputs the instruction signal comprising an alarm instruction when the sense signal received from at least part of the at least one sub-sensing module is greater than or equal to a first preset value;
   wherein the first preset value is a magnitude of the sense signal outputted from the sensing module when the flexible device is in a first bend state.

7. The instruction signal generation apparatus of claim 1, wherein the responding module outputs the instruction signal comprising an operation instruction when it receives at least two sense signals within a certain period of time and the sense signals are greater than a second preset value but smaller than the first preset value;
   wherein the first preset value is a magnitude of the sense signal outputted from the sensing module when the flexible device is in a first bend state; and the second preset value is a magnitude of the sense signal outputted from the sensing module when the flexible device is in a second bend state.

8. The instruction signal generation apparatus of claim 7, wherein
   the at least two sense signals are generated from different bend directions of the flexible device; or
   the at least two sense signals are generated from a same bend direction of the flexible device.

9. The instruction signal generation apparatus of claim 7, wherein the operation instruction comprises any one or more of turning page forward, turning page backward, switching application program forward, switching application program backward and switching displayed picture.

10. The instruction signal generation apparatus of claim 1, further comprising an execution module configured to execute an instruction in the instruction signal outputted from the responding module upon receipt of the instruction signal.

11. The instruction signal generation apparatus of claim 10, wherein the execution module comprises a buzzer, a vibrator or an indicator light for executing an alarm instruction.

12. A flexible device comprising the instruction signal generation apparatus of claim 1.

13. The flexible device of claim 12, wherein the flexible device is a flexible display device, and the responding module is integrated on a circuit board on which a data driving circuit or a scan driving circuit of the flexible display device is located.

14. The flexible device of claim 12, wherein the flexible device comprises a display area and a non-display area, the sensing module is disposed surrounding the display area of the flexible device.

15. A bend detection method for a flexible device, comprising:
    obtaining a bend sense signal whose magnitude is associated with a bend degree of the flexible device, and
    generating an instruction signal according to the bend sense signal,
    wherein, the bend sense signal is generated by at least part of a plurality of sub-sensing modules each of which comprises a piezoelectric sensing layer, a first electrode disposed on a surface at one side of the piezoelectric sensing layer and a second electrode disposed on a surface at the other side of the piezoelectric sensing layer.

16. The bend detection method of claim 15, wherein the sub-sensing, modules are distributed at a plurality of positions on the flexible device.

17. The bend detection method of claim 15, wherein the instruction signal comprises any one or more of alarming, turning page forward, turning page backward, switching application program forward, switching application program backward and switching displayed picture.

* * * * *